Patented Sept. 1, 1931

1,821,703

UNITED STATES PATENT OFFICE

ROY S. GOODENOW, OF CHICAGO, ILLINOIS, ASSIGNOR OF ONE-HALF TO GEORGE L. CURTIS, OF CLINTON, IOWA

GUM-RESIN COMPOUND

No Drawing. Application filed August 13, 1927. Serial No. 212,839.

The main object of this invention is to produce an elastic cement or protective coating which has the adhesive qualities and chemical characteristic of the gum resins and elasticity similar to that of rubber.

My invention comprises the discovery that when commercial raw rubber, or latex, each of which contains acids and gums similar in certain respects to the acids and gums present in the fossil gums, is combined in intimate physical mixture with a fossil gum, the latex being coagulated, the acids and gums act upon each other, and form a new product with new physical characteristics and of high commercial value, the peculiarity being that the new product is soluble at low temperatures in the solvents in which the fossil gums are substantially insoluble. The result of the mixture is to change the solubility somewhat as fusibility is affected in the formation of the soldering alloys which fuse at a lower temperature than the melting point of the metals contained therein. The addition of the finely divided gum to the latex promotes coagulation of the latex more readily in a similar manner to the coagulation produced by heat or an acid or an astringent plant juice.

Copal and other gums and gum resins such as herein referred to are commonly designated in the trade as "fossil gums", regardless of their origin, and I use the lattermost term in this broad, generic sense. They are obtained either directly from trees, or as fossil remains.

An illustrative process of preparing a mixture of latex and gum resins comprises grinding the fossil gum, such as kauri, Zanzibar, Manila copal and the like, which are brittle in structure, into substantially a powder, the particles having a diameter approximating one-two hundredth of an inch. The finely divided gum is sprayed on a freshly formed film or thin sheet of uncoagulated latex so as to form a thin coating of latex completely surrounding each individual particle of the finely divided gum. The gum containing latex or crude rubber film is then combined into a mass which is worked through a rubber mill to insure an even distribution of the gum particles throughout the mass to work the rubber and to assist in removing the water content. The product, as it comes from the mill, is substantially an unvulcanized rubber sheet film impregnated with finely divided fossil gums. The presence of the fossil gums, disseminated in the rubber sheet, retards oxidation and the sheet can be kept as stock for a comparatively long time. This product is known as the stock sheet or slab.

From the stock sheet are prepared elastic cements and protective coatings of low permeability by dissolving the stock sheet in turpentine, naphtha, benzine, carbon tetrachloride, or the like. The dissolved stock sheet, depending upon the amount of solvent present, passes through all of the states from a liquid having a dependent form and an independent volume which will flow easily, to an elastic mass having substantially an independent form and volume. At any stage of evaporation, the material with the solvent still present can be put into closed receptacles and kept indefinitely without separation of the ingredients. When the mass is of jellylike consistency it can be spread upon a surface and evaporation will continue while the mass acquires a more or less independent form but will not lose its elasticity or its adhesive qualities.

The cement so formed has in part the elasticity of rubber and does not rapidly deteriorate when exposed to weather conditions as does rubber and the final product has the adhesive qualities and the chemical stability of the fossil gums without being brittle.

The stock sheet product can also be vulcanized in a similar manner and with the same materials used in the vulcanization of the regular sheet rubber at low temperatures. The gum resins with crude rubber or latex, when combined and vulcanized, form a new compound which has very high adhesive qualities.

Where ultimate vulcanizing or "curing" is to be provided for, in any phase of the process of this invention, either when the product is to be used in sheet form or as a liquid, an appropriate agent is added at such time and in such manner as circumstance may favor. For instance, sulphur flour may be used. Other agents or accelerators include litharge, white lead and "vulcone". Other well-known ingredients may be added, as for instance, chalk, clays, "asbestine", zinc oxide, etc.

In general it is immaterial as to just where in the process such additions are made. When latex, either coagulated or uncoagulated, is used, the vulcanizing agent and accelerator may be added as and when the gum is added. When crude rubber is used the gum and other agents may be milled in together. When old rubber is devulcanized and "reclaimed", it may be treated substantially as new raw rubber for the purpose of this process.

For hot vulcanizing I prefer 2% by weight of sulphur, but for cold vulcanizing I use an ounce of sulphur chloride to a gallon of benzole, carbon bisulphide or like solvent.

For cold vulcanizing or cure as of thin sheets, or for cement soon after application, I find it well to dip, spray, fume or brush the same with sulphur chloride (1 oz.) with benzole (1 gal.) or with toluol or carbon bisulphide.

It is to be understood that commercial latex such as I refer to, is an aqueous solution consisting of about 60% of milk rubber with a complement of water containing about 2% of ammonia or other retardent, such for example, as formaldehyde, borax, etc.

When a thin stock sheet is placed between cloth, wood or glass, vulcanization can be accomplished at or near the boiling point of water and when so vulcanized between layers or material of the same kind or different kinds, forms a very strong adhesive which is at the same time flexible.

When the stock sheet is dissolved and the material is in a liquid form, it may be poured or spread upon a floor or similar surface and allowed to partially evaporate. On such a prepared surface comminuted cork or granite or the like may then be spread and pressed into the cement by using a trued surface, forming a coating for floors or walls which has the wearing or protective qualities of the material cemented on the surface and an elastic bond between such material and the holding surface.

The physical properties of the stock sheet material produced, respecting its fitness for making cements or coatings adapted for specific needs, depend upon the proportion in which the resinous material and latex are combined. For general purposes about equal parts by volume of said materials may well be used, it being understood that if greater adhesiveness and tenacity are desired a greater proportion of resin should be used up to about 75%, whereas if greater flexibility is desired more latex should be used. As the materials vary somewhat in quality according to their source and handling, and as requirements regarding adhesiveness and flexibility vary according to desired ultimate use of the cement or coating to be produced, refinements in proportion are best left to the skill of the artisan who can readily appraise sufficiently whatever variables characterize the materials, and to whom the specific end requirements in each instance should previously be made known.

It is to be understood that although making the resin-latex compound may be conducted commercially as a distinct stock supply process, still in practical effect it is merely an initiatory step in the production of an ultimate protective coating or a cement. The "stock sheet" feature is merely incidental to frequent convenience in handling, storage and application, but the operation may be continuous from mixing the ingredients and forming the "stock" mass, to vulcanization, or to liquefaction by solvents, and ultimate use as a cementitious adhesive or coating. Although latex is now the form commonly adopted for import, still, "raw", "dry" or "smoked" rubber, such as formerly was the only form for import, is substantially the full equivalent of latex for the purpose of this invention. When "raw" rubber is used it is first milled with sufficient solvent to render it workable, and the gum is then incorporated therein, substantially as when latex proper is used.

The gum resins, as a class, are substantially insoluble in ordinary solvents at ordinary temperatures but become commercially soluble at low temperatures in the presence of coagulated latex or milk rubber when combined in the process here described. This, therefore, is the essential feature of my discovery and while I have described certain specific practical applications of the compound, it will be understood that other applications and variations of the method of making and use of the compound may be made without departing from the spirit of my invention as defined by the following claims:

I claim:

1. The manufacturing process which consists in mixing a finely divided powdered fossil gum with uncoagulated latex and thereby producing a pasty mass, and then working the same into a sheet.

2. As a product of manufacture, a potentially cementitious stock sheet, comprising only finely divided fossil gum and coagulated latex in which said gum is uniformly disseminated mechanically, in which sheet the gum contributes inherent adhesive qualities and the latex contributes elastic quality.

3. As a product of manufacture, a stock sheet comprising only coagulated latex and finely divided fossil gum disseminated mechanically therein, which sheet is responsive to vulcanization for conversion into a low permeability coating of cementitious character.

4. The manufacturing process which consists in mixing a finely divided fossil gum with uncoagulated latex and thereby producing a pasty mass, and then working the same into a sheet, the mixing being accomplished by applying the gum particles to a thin sheet of latex which rapidly coagulates and retains the particles therein.

5. As a product of manufacture, a compound comprising mainly and substantially alone, finely divided resin gum powder disseminated in coagulated latex.

6. The method of making an elastic cement base of great adhesiveness which may be dissolved in a solvent and which consists in intimately mixing a finely divided powdered resin gum with latex.

7. The process which consists in spraying fine powdered gum of the character described on a fresh film of uncoagulated latex.

8. The process of forming a certain useful compound of substantially solid character, but which is responsive to the usual solvents of rubber, which consists in mixing a finely divided powdered fossil gum with rubber and thereby causing the gum to combine with the acids of latex contained in the rubber.

Signed at Chicago this 5th day of August 1927.

ROY S. GOODENOW.